United States Patent [19]

Simjian

[11] 4,258,252

[45] Mar. 24, 1981

[54] CHECK CONTROLLED METERING DEVICE

[76] Inventor: Luther G. Simjian, Lago Mar Pl., 1750 S. Ocean La., Fort Lauderdale, Fla. 33316

[21] Appl. No.: 58,755

[22] Filed: Jul. 19, 1979

[51] Int. Cl.³ .......................... G06K 3/12; G06F 7/08
[52] U.S. Cl. ...................................... 235/432; 235/381
[58] Field of Search .......................... 209/900; 234/89; 179/6.3 R; 235/379, 380, 487, 375, 419, 432, 423; 340/149 A

[56] References Cited

U.S. PATENT DOCUMENTS

| 3,716,698 | 2/1973 | Simjian ..................................... 234/89 |
| 3,743,134 | 7/1973 | Constable .............................. 235/487 |
| 3,792,446 | 2/1974 | McFiggins .............................. 364/900 |
| 3,870,866 | 3/1975 | Halpern ................................. 179/6.3 R |
| 4,007,355 | 2/1977 | Moreno ................................. 235/379 |
| 4,020,325 | 4/1977 | Pfost ..................................... 235/480 |

Primary Examiner—Daryl W. Cook

[57] ABSTRACT

A postage meter is used in conjunction with a check which serves for updating, i.e. increasing the credit register, by a predetermined sum of money. The check is keyed to the particular meter either prior to or after updating the register, and means are provided to invalidate the check after use and to provide the check with data related to the meter.

11 Claims, 4 Drawing Figures

CHECK CONTROLLED METERING DEVICE

SUMMARY OF THE INVENTION

This invention refers to metering devices which are adapted to dispense a unit of value in response to being charged with a sum of money. Typical of such devices is the commercially used postage metering device which is adapted to imprint variable amounts of postage on envelopes and tapes as long as the credit balance remains above a predetermined sum of money. When the predetermined minimum credit balance is reached, the meter is inhibited from imprinting further postage. At that time or at some time prior to reaching the minimum credit balance the meter must be recharged, that is, the credit register must be set to a monetary value in excess of the minimum balance. Such recharging most commonly is done by bringing the removable register portion of the metering device to the Post Office and upon paying a sum of money, for instance $\neq$500.00, an authorized Post Office employee using a special key sets the credit register to a value reflecting the $\neq$500.00 payment. In the recent period a system has come into use in which the meter can be recharged by obtaining a code from a remotely located computer, thus avoiding the need of bringing the register to the Post Office. Illustrative of the various arrangements of postage meters and means for restoring the credit register to a balance above a minimum without bringing the meter to the Post Office are U.S. Pat. Nos. 3,255,439; 3,428,948; 3,501,744; 3,596,247; 3,716,698 and 3,792,446.

The instant invention also overcomes the need for removing the register and bringing it to the Post Office and instead uses a special code means which is purchased from the Post Office or a bank. The code means, for instance a specially coded check, is purchased by the meter owner and is used whenever the credit register requires to be reset to reflect an increased credit balance. A check of this type may be purchased at the Post Office personally, or may be purchased via the mails.

The present invention, therefore, discloses an arrangement for simplifying the process of recharging the credit register by obviating the need for a trip to the Post Office or the use of computer means. Instead, the present invention contemplates the use of a check which, if found valid, is used to update the credit register to reflect an increase by a predetermined amount of money. Additionally, the invention includes also means for insuring that a check is useable only for one charging or a predetermined number of charging operations and then being invalidated. Moreover, means are provided to affix to the check when used data indicative of the status of the register, thus providing a record of the postage dispensed by the particular meter. This recording closely represents the present requirement where the Post Office must periodically be provided with written data indicating the postage meter usage, that is, the cumulative amount of postage dispensed by the meter installed at a customer. The present invention contemplates that a used check with the use data of the meter affixed thereupon must be returned to the Post Office for purchase of another check adapted to update the credit register.

Other and still further features of the present invention will be more clearly apparent from the following description when taken in conjunction with the accompanying drawings.

DETAILED DESCRIPTION

Figure 1:
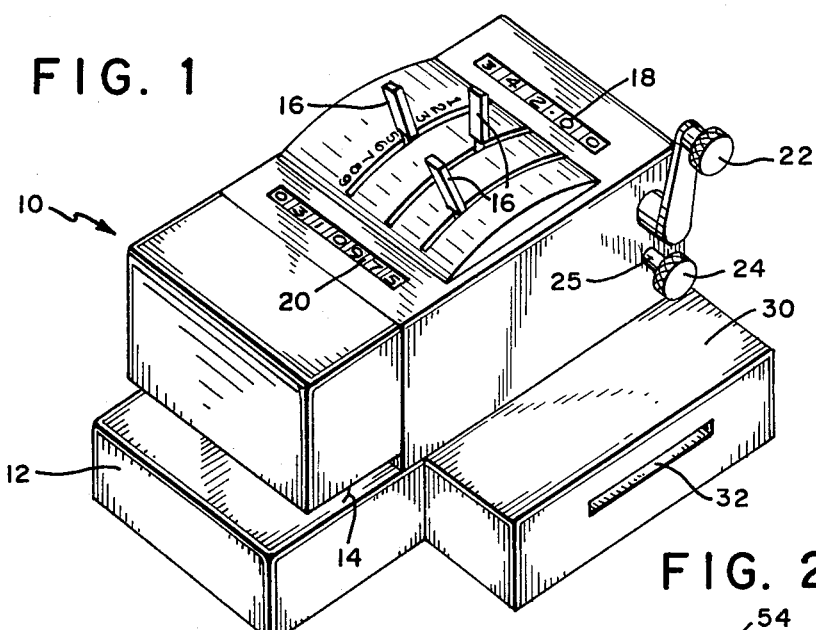
FIG. 1 is a perspective view of the metering device.

Referring now to the figures and FIG. 1 in particular, there is shown a postage meter 10 which includes, quite conventionally, a housing 12 with a slot 14 for receiving therein envelopes or other items upon which a variable amount of postage is to be affixed. There is provided, furthermore, a series of adjustable levers 16 which are movable to the amount of postage to be dispensed. A descending counter 18 displaying numerals in the associated window shows the amount of credit remaining in the credit register while an ascending counter 20 with an associated display window indicates the cumulative amount of postage dispensed. A lever 22 is operable for imprinting the amount of postage set by levers 16 whereupon the counters 18 and 20 forming a part of the register mechanism reflect the changed status of the register, that is, the counter 18 shows the amount of credit remaining in the register whereas the counter 20 indicates the new value of the cumulative amount of postage dispensed. The knob 24 mounted below the lever 22 when turned to serves to increase the credit register by a predetermined amount. The mechanism shown hereinabove is substantially the same as is available in the conventional postage meter except that the knob 24 has been repositioned, see for instance U.S. Pat. No. 3,596,247.

The modification of the present arrangement comprises the check accepting means 30 extending laterally from the base of the housing 12 and containing additional mechanisms which will be described hereinbelow. The check accepting means includes a slot 32 for receiving therein a check substantially as shown in FIG. 2.

Figure 2:
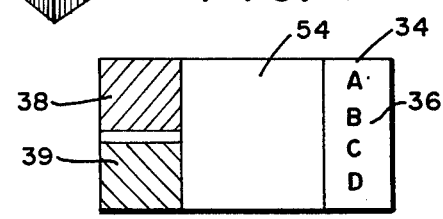
FIG. 2 is a plan view of a typical check used for the instant invention.

With reference to FIG. 2, a check 34, typically a plastic card, is provided with certain imprinted material 36 and two fields 38 and 39, preferably magnetic areas which are encoded with data. In the present emodiment, the field 38 is encoded with data for resetting the credit register to an increased credit balance while the field 39 is encoded with data keying the check to a specific metering mechanism or register. A check of this type is purchased from the Post Office or some other agency and is necessary for "updating," that is charging, the postage meter for increasing the balance of the credit register by a predetermined sum of money.

Figure 3:
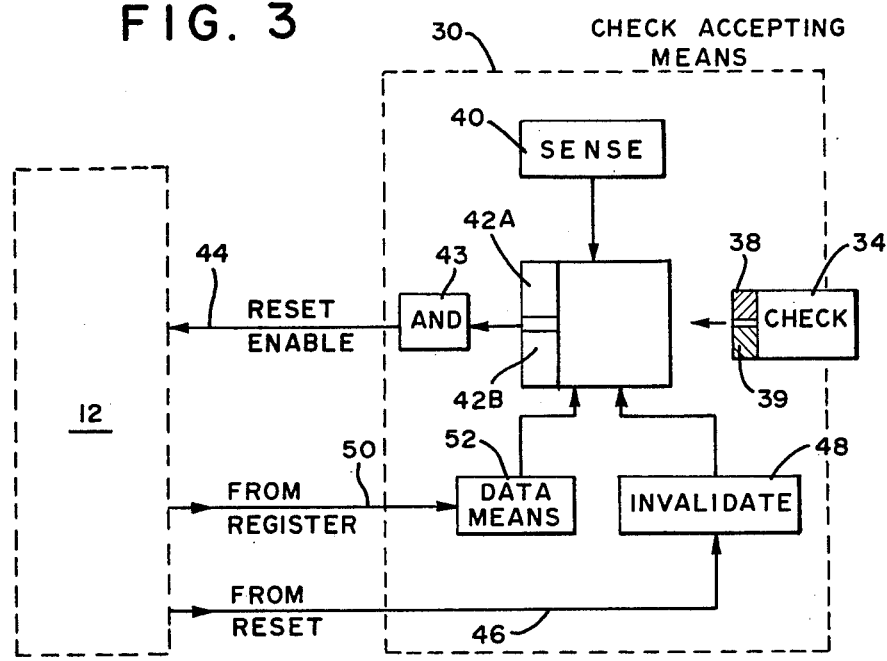
FIG. 3 is a schematic block diagram of the features comprising the present invention.

In order to update the credit register the check is inserted into the slot 32 of the check accepting means 30. With reference to FIG. 3, a sensing means 40 establishes the presence of the check 34 in the check accepting means. The sensing means, typically, comprises a microswitch or lighrt responsive control means. The validation means 42A and B responsive to operation of the sensing means 40 are actuated to sense the coded fields 38 and 39 of the check to establish its validity in connection with the meter, field 39 and the credit, field 38. If the check is deemed invalid, the validation means 42A and 42B fail to provide a proper output signal. However, if the fields 38 and 39 are suitably encoded, the validation means 42A and 42B send a signal to the AND gate 43 which sends a suitable enable signal via conductor 44 to the credit register for causing the shaft 25 of the knob 24 which normally is uncoupled to become coupled to the credit register. Upon rotating the knob 24 while the shaft 25 is coupled, the credit register is increased by a predetermined sum of money whereupon the knob 24 becomes disabled once again. The use of a clutch mechanism for temporarily coupling the shaft 25 to the credit register for charging the credit register is shown, for instance in my previously issued U.S. Pat. No. 3,501,744, FIG. 5, items 82 and 90. Responsive to the resetting of the credit register a signal is furnished via conductor 46 to an invalidating means 48 which acts upon the coded field 38 of the check 34 to cause invalidation of the check so as to inhibit subsequent use thereof. In addition, a signal from the register provides along input means 50 data corresponding to the setting of the register to the data means 52 which includes encoding means for encoding the area 54 of the check, see FIG. 2, with data responsive to the status of the register, in the preferred embodiment the setting of the ascending counter 20 which contains the cumulative amount of postage imprinted. The data means 52 may be driven mechanically from the register or, alternatively, it can comprise an electrical repeater system which sets the encoding means to the setting of the counter of the register. The check can now be withdrawn from the postage meter and upon its return to the Post Office or to the issuing agency, a new check can be purchased to once again charge or reset the credit register. By virtue of the check 34 having retained the meter identification in field 39 and having been provided with data representing the status of the register such as the cumulative amount of postage dispensed, the check serves the same documentary evidence as is required now by the Post Office where the subscriber periodically must submit a postal card stating the meter number and the readings of its ascending register for indicating the cumulative amount of postage dispensed by the meter under his control. In addition, return of the check with meter identification in field 39 may trigger or authorize the issuance of a new check for updating the register subsequently.

Figure 4:
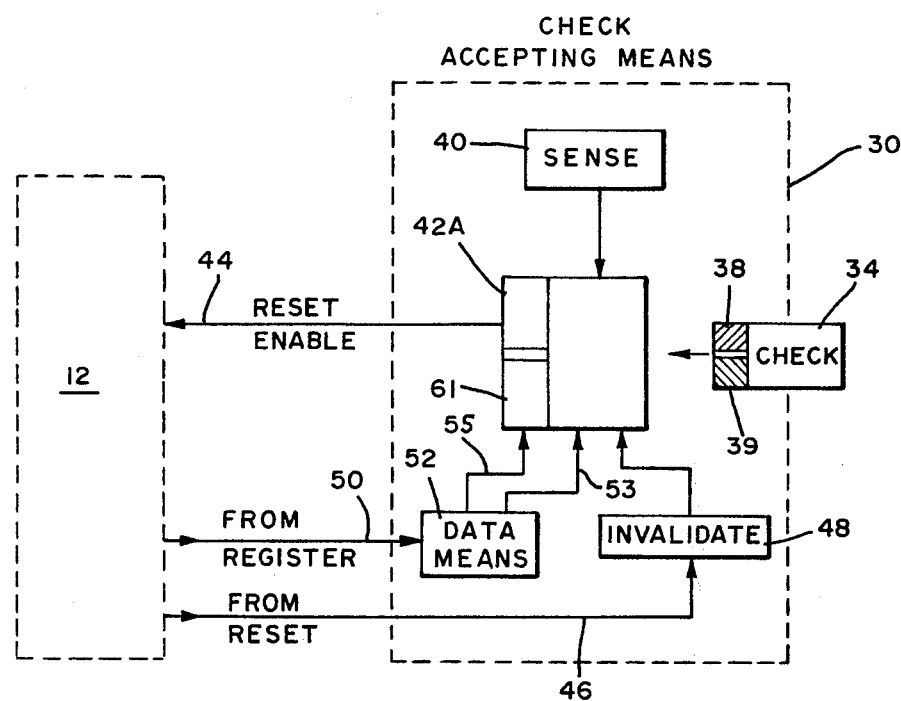
FIG. 4 is a schematic block diagram of an alternative embodiment of the invention.

In an alternative embodiment, FIG. 4, the check 34 when purchased is encoded only in field for permitting, provided the code is valid, resetting of the credit register to a condition representative of an increased credit balance. As shown in FIG. 4, the validation means 42A upon sensing the field 38 and determining validity is adapted to send an enable signal via conductor 44 to the clutch mechanism supra. Upon resetting the register, the data means 52 receives two sets of information. The first data, as previously, pertains to the status of the meter or register and such data, for instance the amount of postage dispensed are applied to the check 34, for example field 54, conductor 53. The other data pertaining to the identity of the meter or register, such as the identifying serial number, is supplied by the data means 52 via conductor 55 to encoding means 61 for encoding the check with the data which key the check to the specific register. As previously, the invalidating means 48 are operative upon the field 38. When the latter check is brought to the Post Office, the Office once again has a record of the meter identification and of the postage dispensed by the specific meter.

In a further alternative embodiment, the check 34 is inserted into the check accepting means 30 and upon validation thereof, the credit register is reset as described heretofore, but it is required that the check remain inserted for retaining the meter operative. For updating the credit register with a new incremental amount of money, the check is withdrawn and a new or second check is inserted. However, prior to the withdrawal of the first check, responsive to a control mechanism, such as a manually operated push button, the data means 52 is provided with the setting from the register and in turn encodes the check, whereupon this check is ejected and further operation of the postage meter is inhibited and only restored by a succeeding check. In this latter embodiment the Post Office receives information of the status of the meter, which information is of a more recent date. However, since the historical record of a postage meter is of importance, it does not appear important as to which of the arrangements is used. In addition, if desired, the data means 52, of course, may include a dating device to affix also the date when the imprinting occurred.

The validation means 42A and 42B comprise preferably magnetic sensing and deciphering means as are commonly used in bank credit machines. The invalidating means 48 may comprise printing or punching means, demagnetizing means, heating means, or other mutilating means.

As is evident from the above description, the present arrangement overcomes the need for periodically transporting the meter mechanism to the Post Office and instead provides for the use of a check which is purchased from the Post Office or some other agency and serves for updating the credit register of the postage meter. Safeguards are provided so that the check must be of proper character and is invalidated after use.

While there has been described a preferred embodiment of my invention and several modifications have been indicated, it will be apparent to those skilled in the art that various further changes and modifications may be made therein without departing from the principle of the invention which shall be limited only by the scope of the appended claims.

What is claimed is:

1. A metering device of the postage meter type or similar type comprising:
    a metering mechanism including printing means for printing adjustable indicia representative of monetary units;
    register means including a credit register and a cumulative register coupled to said printing means for registering in response to the operation of said printing means respectively the credit balance remaining in the metering mechanism and the cumulative monetary units printed;
    control means coupled to said credit register and said printing means for precluding operation of said printing means when said credit register assumes a condition representative of a minimum credit balance;
    resetting means coupled to said credit register for resetting said credit register to a condition representative of an increased credit balance;
    check acceptance means coupled to said metering mechanism for accepting a check;
    validation means cooperatively associated with said acceptance means and coupled to said resetting means for determining the validity of a check accepted by said acceptance means by sensing a first field encoded with data for resetting said credit register to an increased credit balance and a second field encoded with data keying the check to a specific metering device of a respective check, and in response to said first field and said second field being determined valid rendering said resetting means operable for resetting said credit register to a condition representative of an increased credit balance, and invalidating means coupled to said resetting means and said check acceptance means for invalidating a check determined valid responsive to said resetting means having been rendered operable and reset said credit register.

2. A metering device as set forth in claim 1, said invalidating means operating upon one of said encoded fields.

3. A metering device as set forth in claim 1, and means sensing the placing of a check in said acceptance means and in response thereto causing operation of said validation means.

4. A metering device as set forth in claim 1 and further means coupled to said resetting means and said metering mechanism for providing said check with data pertaining to said register means in response to the operation of said resetting means.

5. A metering device as set forth in claim 4, said data pertaining to the status of said cumulative register.

6. A metering device as set forth in claim 1, said resetting means including a manually operable control.

7. A metering device as set forth in claim 6, said manually operable control being adapted to operate a clutch mechanism.

8. A metering device of the postage meter type or similar type comprising:

a metering mechanism including printing means for printing adjustable indicia representative of monetary units;

register means including a credit register and a cumulative register coupled to said printing means for registering in response to the operation of said printing means respectively the credit balance remaining in the metering mechanism and the cumulative monetary units printed;

control means coupled to said credit register and said printing means for precluding operation of said printing means when said credit register assumes a condition representative of a minimum credit balance;

resetting means coupled to said credit register for resetting said credit register to a condition representative of an increased credit balance;

check accepting means coupled to said metering mechanism for accepting a check;

validation means cooperatively associated with said accepting means and coupled to said resetting means for determining the validity of a check accepted by said accepting means by sensing a predetermined encoded field of a respective check and in response to the encoded field being determined valid rendering said resetting means operable for resetting said credit register to a condition representative of an increased balance, and further means coupled to said resetting means and said metering means for providing a check with data keying the check to said metering mechanism responsive to said resetting means having been rendered operable and reset said credit register.

9. A metering device of the postage meter type or similar type as set forth in claim 8, and invalidating means coupled to said resetting means and said check acceptance means for invalidating a check responsive to said resetting means having been rendered operable and reset said credit register.

10. A metering device of the postage meter type or similar type as set forth in claim 8, and data means coupled to said register and said check acceptance means for providing the check with data pertaining to the status of said register means.

11. A metering device of the postage meter type or similar type as set forth in claim 10, said data pertaining to the status of said register means including the status of said cumulative register.

* * * * *